Patented June 15, 1948

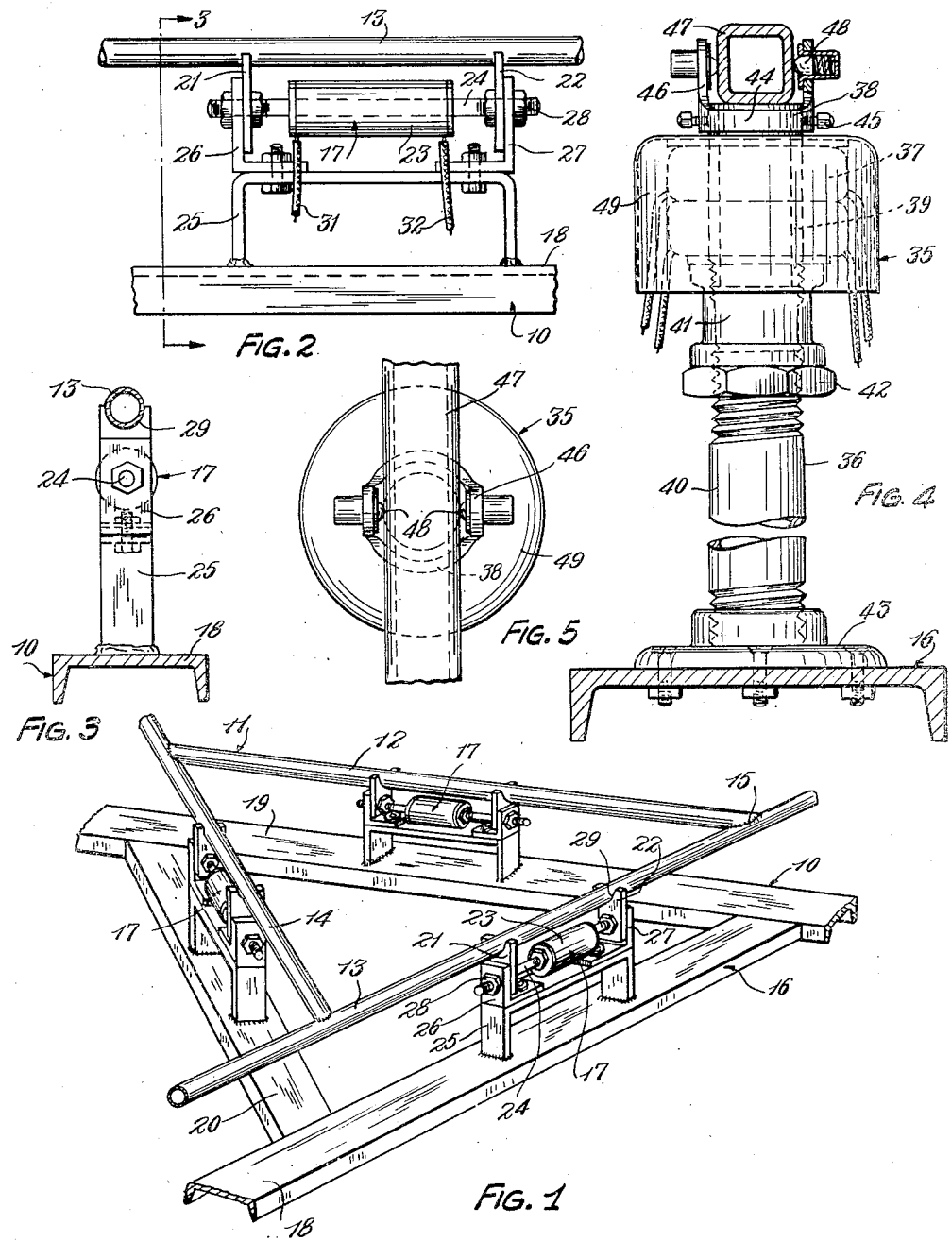

2,443,582

UNITED STATES PATENT OFFICE 2,443,582

WORK HOLDER

Benjamin C. Lendo and Frank Pizmoht, Cleveland, Ohio, assignors to Designers for Industry Inc., Cleveland, Ohio, a corporation of Ohio Application September 11, 1944, Serial No. 553,614

4 Claims. (Cl. 113—99)

This invention relates to work holders and, more particularly, to work holders of the kind used for holding component metal parts in place while they are being connected together and is especially useful for holding such parts for welding together by the use of gas flames or metal electrodes.

In the fabrication of various structures by welding together component parts formed of steel or steel alloy, it is important that the parts be held in their proper relation to each other during the welding cycle or operation. Since such parts are subject to expansion and contraction during the welding it has heretofore been necessary to provide the welding jigs or fixtures being used, with a flexible or yieldable means for holding such component parts in a manner to permit such expansion and contraction. This has involved the use of heavy and expensive apparatus including locating pads or brackets together with mechanical clamps for the work pieces, and spring means located either in the clamps or in the mountings for the pads or brackets so as to provide the necessary flexibility for expansion and contraction. The production of fabricated structures by the use of this previous apparatus was slow inasmuch as several manual operations were required and in many instances the pads, clamps or other parts of the apparatus interfered with the accessibility of the portions of the work to be joined or welded.

The present invention eliminates these difficulties by providing a novel form of work holder in which electromagnets are employed for holding the various work pieces in the desired relation and in a manner to permit expansion and contraction to readily take place, and such that the work portions to be joined or welded will be freely accessible for the operations to be performed thereon.

Another object of this invention is to provide a novel form of magnetic work holder in which a plurality of electromagnets mounted in an arrangement corresponding generally with the shape of the work structure to be produced, support and hold the component work pieces in position for the welding cycle or operation and yet permit expansion and contraction to take place.

Still another object of this invention is to provide a novel work holder of this character which is of a simple and economical construction and the use of which reduces the time and labor required in producing various kinds and types of welded assemblies.

Other objects and advantages of the invention will be apparent from the following description when taken in conjunction with the accompanying drawing in which Fig. 1 is a perspective view showing the novel work holder of the present invention being used in the production of a fabricated work structure;

Fig. 2 is a partial side elevation showing one of the electromagnets of the apparatus;

Fig. 3 is a transverse sectional view taken on line 3—3 of Fig. 2;

Fig. 4 is a side-elevation, with portions broken away, showing a modified form of construction for the electromagnets of the improved work holder; and Fig. 5 is a plan view of one of the modified electromagnets.

The work holder of the present invention can be used in the production of various structures to be fabricated from bars, tubes or the like, of steel, steel alloy or other magnetic materials and is especially suitable for rapidly and economically producing welded structures for aircraft such as fuselage frame, landing gears, engine mounts, wing structures and various other parts or sections. Fig. 1 shows one embodiment of the novel work holder 10 being used in the fabrication of a work structure 11. The work structure 11 is in the form of a polygonal frame which, in this instance, is in the shape of a triangle and is formed by three tubes or bars, 12, 13 and 14 made of steel, steel alloy or other magnetic material and connected together by welds 15.

As shown in the drawing, the work holder 10 comprises a frame or support 16 and a plurality of electromagnets 17 mounted on such frame. The frame 16 corresponds generally in shape or form with the work structure being produced or fabricated, and since the work structure 11 shown in this instance is of triangular shape, the frame or support 16 is also of triangular form. The frame 16 can be of any appropriate construction and as here shown may comprise a plurality of structural members or channels 18, 19 and 20 which are welded or otherwise rigidly secured together.

The electromagnets 17 are mounted on the frame 16 in spaced relation and are so disposed relative to each other that they likewise assume an arrangement corresponding generally in shape with the polygonal shape of the frame 16 and the work structure 11 to be fabricated. In the particular form of work holder shown in Fig. 1, one of the electromagnets 17 is mounted on each of the frame members 18, 19 and 20 at or adjacent the mid-point of the side of the polygon formed by such frame member.

Each of the electromagnets 17 comprises a pair of spaced pole members 21, 22 and an energizing winding or coil 23. The pole pieces 21 and 22 form extensions of a core 24 around which the energizing winding 23 is disposed. The magnets 17 may be mounted on the frame 16 by providing appropriate brackets 25 on the respective frame members and which are welded or otherwise attached thereto. The magnets are connected to the brackets 25 by the use of a pair of spaced insulating clips 26 and 27 which are bolted or otherwise attached to the brackets and against which the pole members 21 and 22 are clamped, as by extending the threaded ends of the core 24 through such pole members and clips and applying clamping nuts 28 thereto.

As will be seen from the drawing, the electromagnets 17 are mounted on the respective frame members 18, 19 and 20 so that their pole members 21 and 22 are spaced apart longitudinally of such frame members. The pole members have work receiving portions which are shaped to correspond with the work pieces intended to be held. In this instance, the work pieces 12, 13 and 14 are cylindrical in shape and the pole members 21 and 22 are therefore provided with arcuate recesses 29 in which the work pieces are snugly received. These arcuate recesses provide an increased area of metal-to-metal contact between the work and the pole members so as to render the clamping action of the electromagnets more effective.

From the arrangement as thus far described, it will be seen also that the pole members 21 and 22 of each magnet are engaged and spanned by an intermediate portion of one of the work pieces while other portions of the work piece project outwardly or longitudinally in overhanging relation to the pole members with such projecting portions of one work piece extending substantially into engagement or welding relation with the corresponding projecting portions of the other work pieces. By reason of this arrangement it will be seen also that the portions of the work pieces on which the connecting welds 15 are to be formed are in an exposed and readily accessible position in which the welds can be readily made without interference or obstruction by the magnets or any other part of the work holder.

Although the work holder shown in the drawing and above described in detail is provided with only three electromagnets and is being used for producing a triangular work structure, it will be understood of course that our invention contemplates that any desired number of electromagnets can be employed and that the principle of the invention can be applied to work holders for the fabrication of work structures of various other polygonal shapes.

A suitable energizing circuit or circuits (not shown) is provided for the electromagnets 17 and it is obvious that these electromagnets can be energized separately by the use of individual control switches or simultaneously by the use of a control switch common to all of the magnets. Leads 31 and 32 are shown in Fig. 2 for the magnetizing winding 23.

In Figs. 4 and 5 a modified form of electromagnet 35 is shown which can be used on the frame 16 instead of the electromagnets 17 of Fig. 1. The modified electromagnet 35 comprises a standard 36 having energizing coils 37 and a work supporting head or bracket 38 thereon. The standard 36 is here shown as being made of iron pipe sections 39 and 40 which are connected by a pipe coupling 41 so as to provide for adjustment of the height at which the head 38 is supported above the frame 16. A locknut 42 cooperates with the coupling 41 for locking the pipe sections at the desired height adjustment. The lower end of the standard 36 can be connected with the frame 16 as by means of the pipe flange 43.

The work receiving head 38, which is preferably made of non-magnetic material such as brass, includes a sleeve portion 44 mounted on the pipe section 39 by means of the clamping screws 45 and spaced arm portions 46 adapted to receive therebetween a magnetizable work piece 47 with the latter spanning the upper end of the pipe section 39. The arms 46 can be provided with spring-pressed work gripping elements 48 as shown in the drawings. The magnetizing coils 37 are disposed around the pipe section 39 which forms a pole member and such coils are preferably housed in a shell 49 or the like which is made of non-magnetic material. The modified magnets 35 are mounted on the frame members in spaced pairs so that the pole members of the magnets will be spanned by the work pieces and when the coils 37 of the magnets 35 are energized the magnetic circuits will include portions of the frame members.

During the use of our improved work holder the work pieces can be quickly and easily assembled in their proper relative positions by placing the same in the recessed pole members of the respective magnets. These recessed pole members locate the work pieces in their proper general positions and serve as guides which permit the work pieces to be easily slid in the direction of their longitudinal axes to bring them into their substantially exact positions with respect to each other for the welding cycle. When the magnets are energized the work pieces will be securely held in their prearranged relation so that the welding cycle can be carried out without likelihood of the work pieces being disturbed during the welding. An important advantage of our work holder is that the holding action produced by the electromagnets permits expansion and contraction of the work pieces during the welding operation and, upon completion of the welding cycle, the deenergization of the magnets immediately releases the fabricated work structure for quick and easy removal from the work holder.

While we have illustrated and described our improved work holder in more or less detail, it will be understood, of course, that we do not wish to be correspondingly limited, but regard our invention as including all changes and modifications coming within the spirit of the invention and the scope of the appended claims.

Having thus described our invention, we claim:

1. A work holder of the character described comprising, a frame, a plurality of magnets mounted on said frame so as to provide spaced pole members thereon and said magnets having magnetizing windings, said pole members having top recesses therein shaped to receive and hold work pieces of magnetic material of bar form with intermediate portions of the bars spanning the pole members and other portions of the bars projecting beyond the pole members, said magnets being disposed relative to each other so that the bars supported thereby define a polygonal shape with the projecting portions of the bars extending into substantially meeting relation and said intermediate portions being longitudinally shiftable in said top recesses during expansion and contraction of the work pieces.

2. A work holder of the character described comprising, a polygonal frame correspoding generally in shape with a polygonal work structure to be produced by welding together work pieces of magnetic material of bar form, electromagnets mounted on said polygonal frame at intermediate points of the sides thereof, said electromagnets having magnetizing windings and pole members, said pole members being spaced apart in the direction of the sides of said polygonal frame and having top recesses therein for receiving and holding said work pieces with intermediate portions of said work pieces spanning the spaces between the pole members and other portions projecting beyond the pole members and extending into welding relation to each other, said intermediate portions being longitudinally shiftable in said top recesses during expansion and contraction of the work pieces and alone forming armatures on which the magnetic attraction of the magnets acts for holding the work pieces in said recesses.

3. A work holder of the character described comprising, a polygonal frame of magnetic material corresponding generally in shape with a polygonal work structure to be produced by welding together work pieces of bar form, pairs of electromagnets mounted on said frame at intermediate points of the sides thereof, said electromagnets comprising standards connected with said frame and provided with pole members at their upper ends and magnetizing coils on said standards, said pole members being spaced apart in the direction of the sides of said polygonal frame and having recessed upper ends for receiving and holding said work pieces with intermediate portions of said work pieces spanning the spaces between the pole members and other portions projecting beyond the pole members and extending into welding relation to each other.

4. A work holder of the character described comprising, a plurality of frame members connected together so as to form the sides of a frame of polygonal plan shape, a plurality of electromagnets mounted on said frame at substantially the midpoints of the sides thereof, said magnet comprising magnetizing winding means and a pair of pole members spaced apart in the direction of one of the sides of the frame and said pole members having top recesses therein shaped to receive and support a work piece of magnetic material of bar form with an intermediate portion of such work piece spanning the pole members and with other portions projecting beyond the pole members and extending into welding relation to corresponding projecting portions of work pieces held by the other magnets, said intermediate portions being longitudinally shiftable in said top recesses during expansion and contraction of the work pieces and alone forming armatures on which the magnetic attraction of the magnets acts for holding the work pieces in said recesses.

BENJAMIN C. LENDO.
FRANK PIZMOHT.

REFERENCES CITED

The following references are of record in the file of this patent:

UNITED STATES PATENTS

| Number | Name | Date |
|---|---|---|
| 810,319 | Blazej | Jan. 16, 1906 |
| 1,119,470 | Swantusch | Dec. 1, 1914 |
| 1,343,346 | Buckley | June 15, 1920 |
| 1,956,840 | Walmsley | May 1, 1934 |
| 2,160,405 | Mallalieu | May 30, 1939 |
| 2,254,314 | Reed | Sept. 2, 1941 |
| 2,383,008 | Meister | Aug. 21, 1945 |

OTHER REFERENCES

Weld. Encyclopedia, 11th edition, pub. 1943, Weld. Eng. Pub. Co., Chicago, Ill., p. 319.